(12) United States Patent
Ahn et al.

(10) Patent No.: US 7,528,921 B2
(45) Date of Patent: May 5, 2009

(54) LIQUID CRYSTAL DISPLAY PANEL AND METHOD OF FABRICATING THE SAME

(75) Inventors: Byung Chul Ahn, Anyang-si (KR); Joo Soo Lim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 384 days.

(21) Appl. No.: 11/168,555

(22) Filed: Jun. 29, 2005

(65) Prior Publication Data
US 2006/0139556 A1    Jun. 29, 2006

(30) Foreign Application Priority Data
Dec. 23, 2004    (KR)    ........................ 10-2004-0111511

(51) Int. Cl.
*G02F 1/1339* (2006.01)

(52) U.S. Cl. ........................ 349/153; 349/149

(58) Field of Classification Search ................ None
See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Gluck | |
| 5,668,379 A | 9/1997 | Ono et al. | |
| 5,731,856 A * | 3/1998 | Kim et al. | ........................ 349/43 |
| 5,771,083 A | 6/1998 | Fujihara et al. | |
| 5,793,460 A | 8/1998 | Yang | |
| 5,847,781 A | 12/1998 | Ono et al. | |
| 2002/0080461 A1 * | 6/2002 | Karasawa et al. | ........... 359/254 |
| 2002/0109799 A1 | 8/2002 | Choi et al. | |
| 2003/0137629 A1 * | 7/2003 | Ichioka et al. | ............... 349/149 |
| 2003/0231276 A1 * | 12/2003 | Miki et al. | ................... 349/149 |

FOREIGN PATENT DOCUMENTS

| | | |
|---|---|---|
| CN | 1266199 | 9/2000 |
| JP | 08184849 A * | 7/1996 |

OTHER PUBLICATIONS

Machine translation of Hiraishi Yoichi (JP 08-184849).*
Machine English translation of Ono Yoshihiro JP 06-102522.*

* cited by examiner

*Primary Examiner*—David Nelms
*Assistant Examiner*—Lucy P Chien
(74) *Attorney, Agent, or Firm*—McKenna Long & Aldridge LLP

(57) ABSTRACT

This invention relates to a liquid crystal display panel, including: a first substrate having a common electrode; a second substrate including a pixel electrode that forms an electric field with the common electrode, a thin film transistor connected to the pixel electrode, a signal line that applies a signal to the thin film transistor, and a contact area in an area outside an area where the signal line is, and the contact area applies a common voltage to the common electrode; and a sealant formed between the first and second substrates with a conductive spacer that connects the contact area with the common electrode.

20 Claims, 21 Drawing Sheets

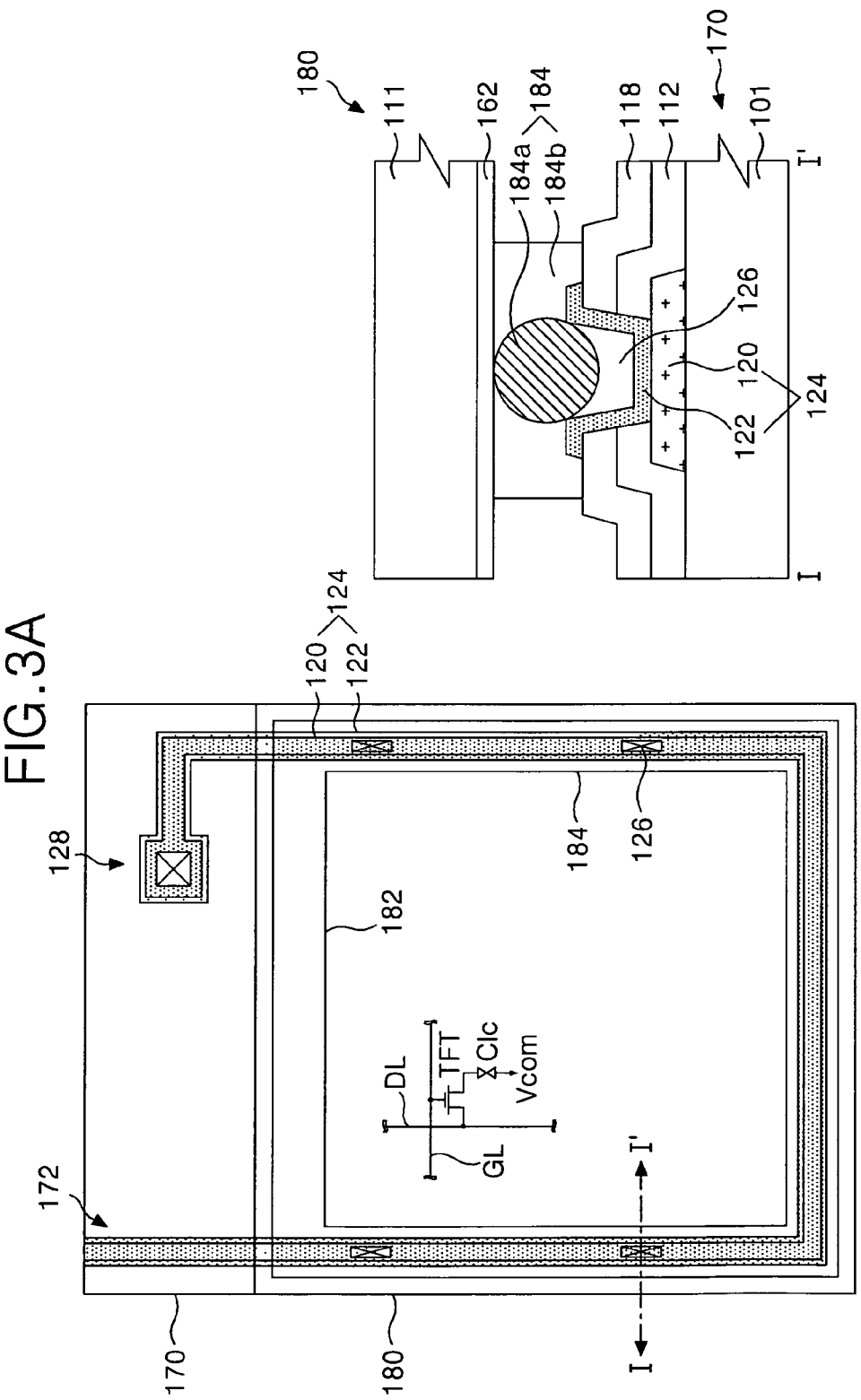

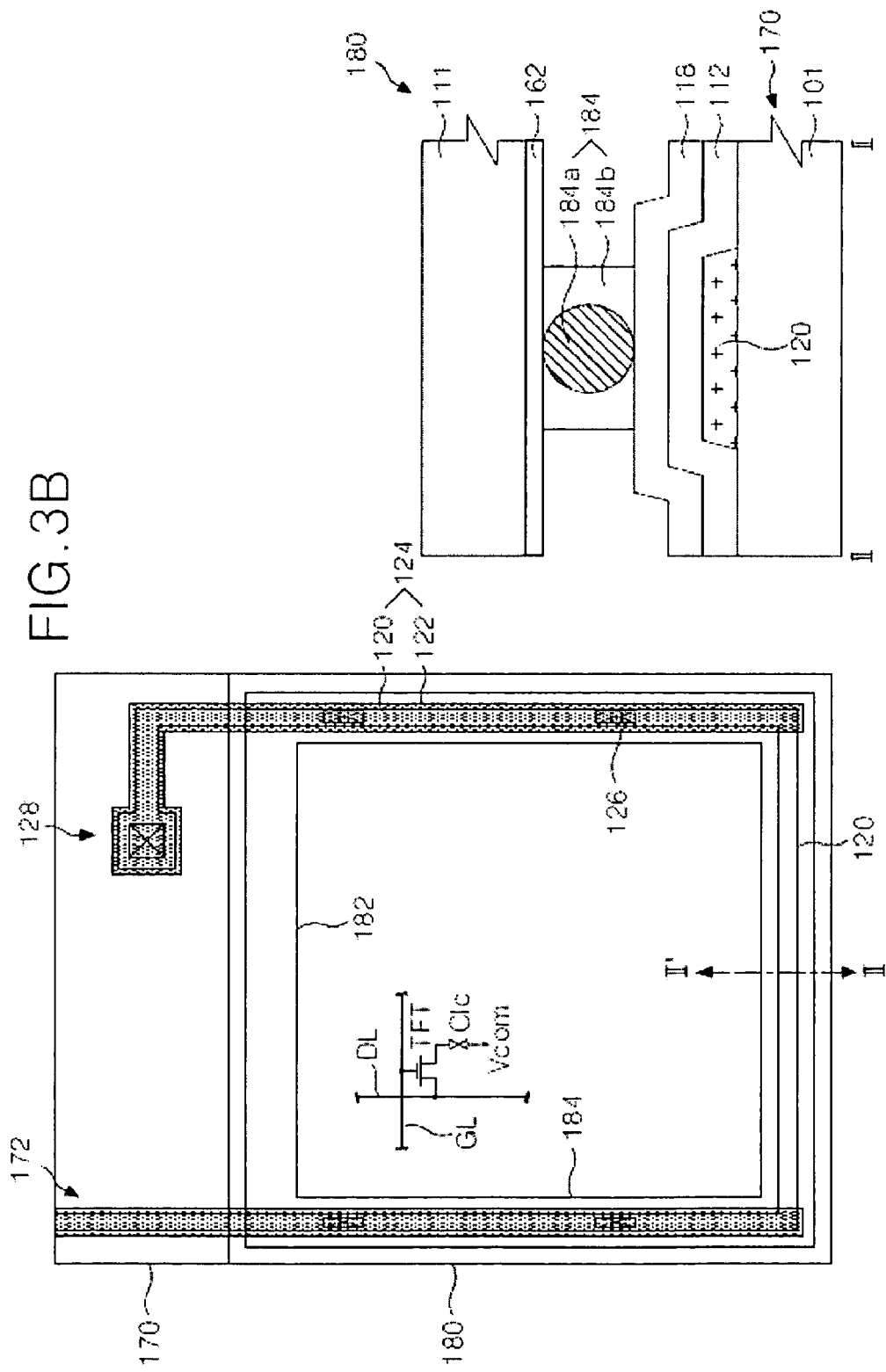

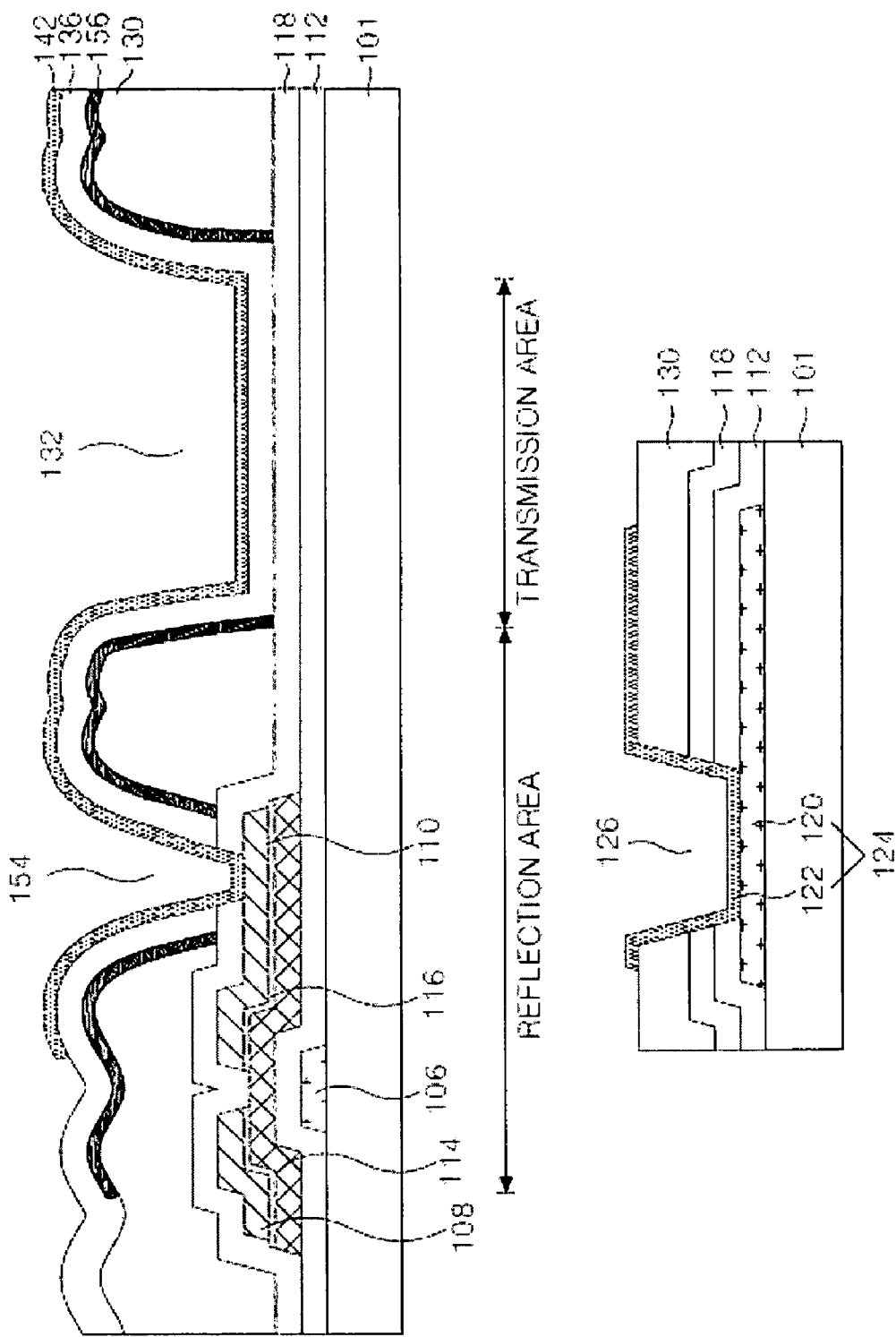

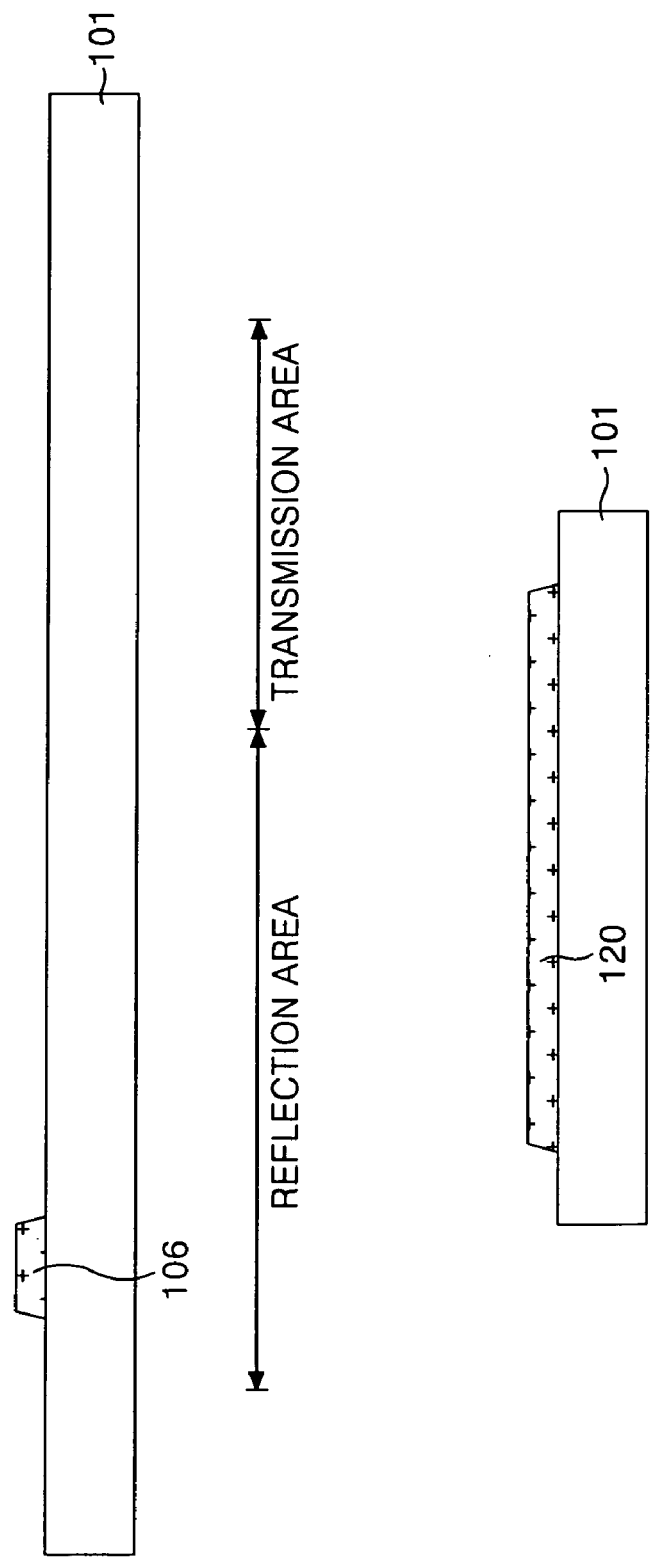

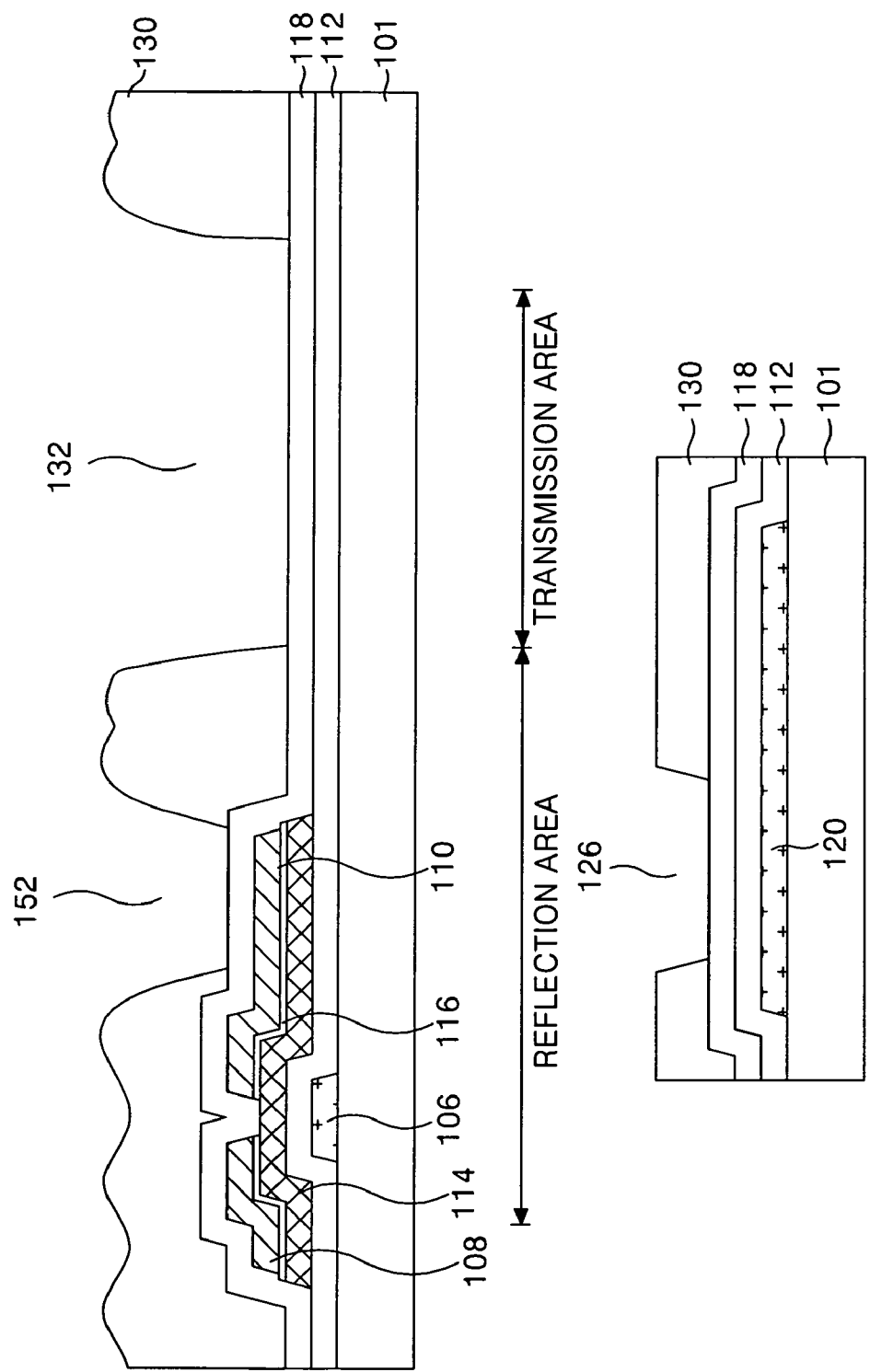

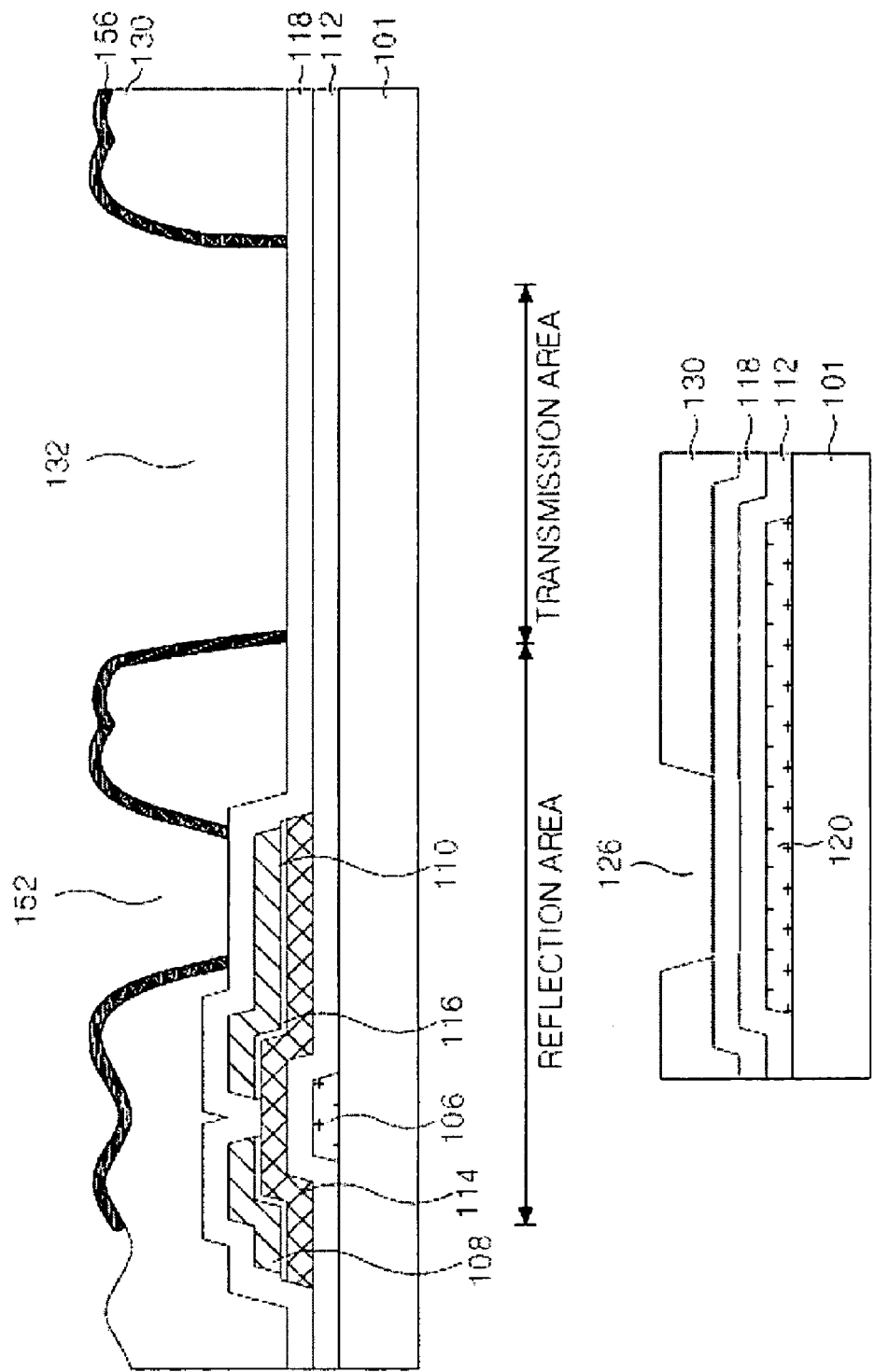

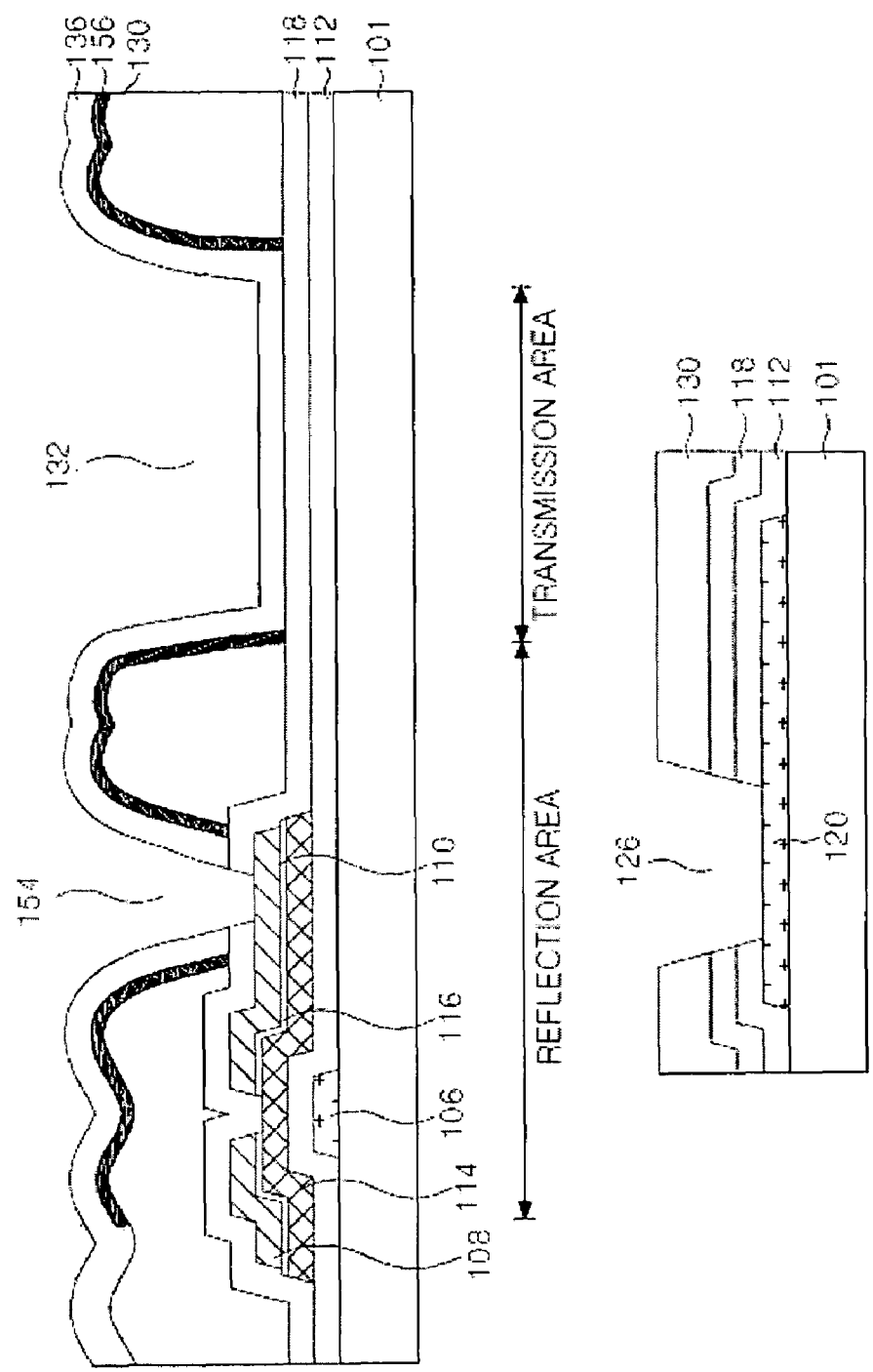

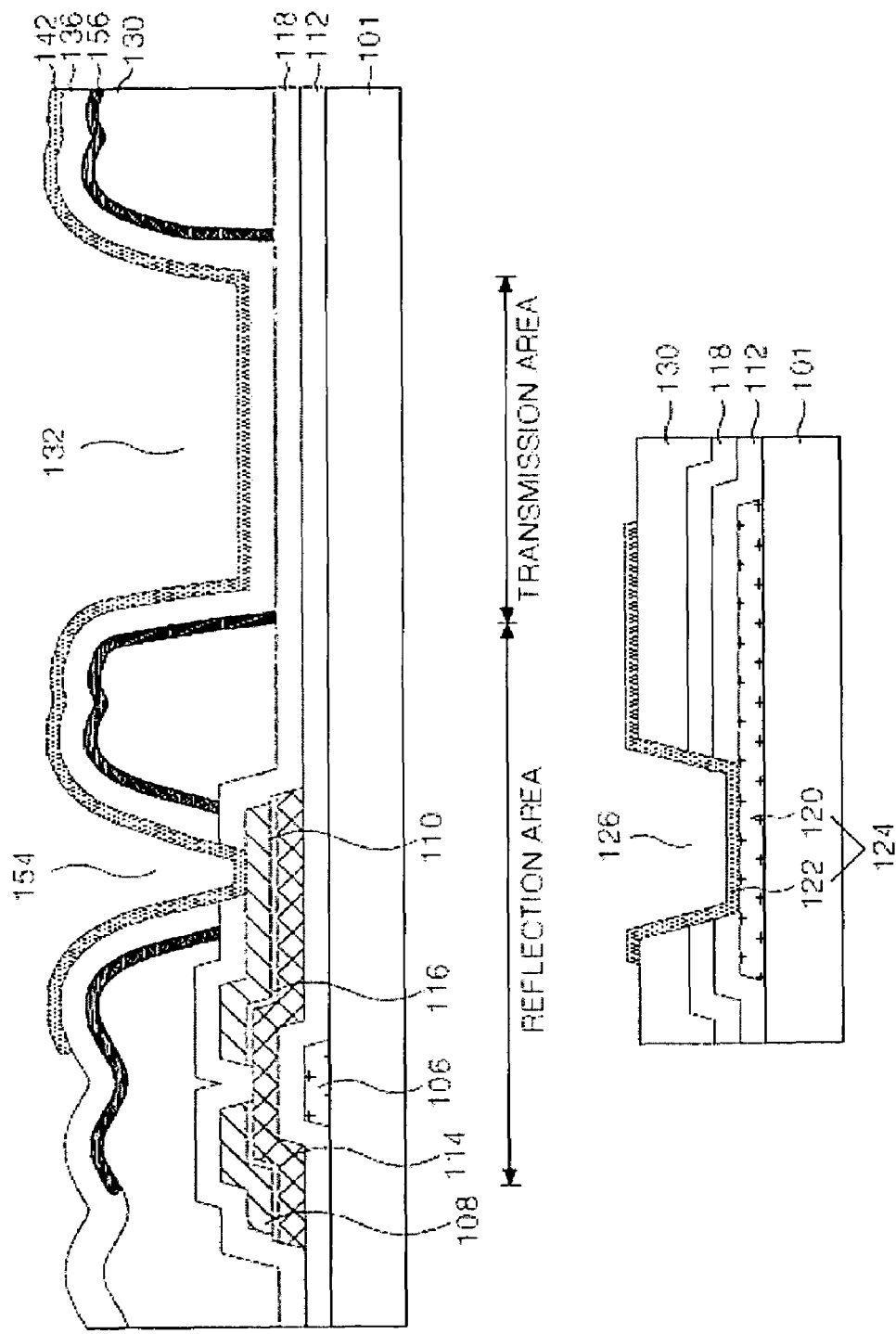

LIQUID CRYSTAL DISPLAY PANEL AND METHOD OF FABRICATING THE SAME

This application claims the benefit of Korean Patent Application No. P2004-111511 filed on Dec. 23, 2004, which is hereby incorporated by reference for all purposes as if fully set forth herein.

BACKGROUND OF THE INVENTION

1. Field of the Invention

The present invention relates to a liquid crystal display panel and a fabricating method thereof, and more particularly to a miniaturized liquid crystal display panel as well as reducing the fabrication time thereof.

2. Description of the Related Art

A liquid crystal display device controls the light transmissivity of liquid crystal by use of an electric field, thereby displaying a picture. The liquid crystal display device, as shown in FIG. 1, includes a thin film transistor array substrate 70 and a color filter array substrate 80 which are opposite to each other with a liquid crystal 16 therebetween.

The thin film transistor array substrate 70 includes a gate line 2 and a data line 4 crossing each other, a thin film transistor 30 formed at this crossing, a pixel electrode 22 connected to the thin film transistor 30, and a lower alignment film that is spread on a lower substrate 1 for aligning liquid crystal 16 thereon.

A color filter array substrate 80 includes an upper substrate 11, a color filter array including a black matrix 18 for preventing light leakage, a color filter 12 for realizing color, a common electrode 14 that forms an electric field with the pixel electrode 22, and an upper alignment film for aligning the liquid crystal 16.

Silver dots are used to apply a common voltage to a common electrode 14 of the color filter array substrate 80. The silver dot electrically connects the common electrode 14 with a common line (not shown) on the lower substrate 1. The common line supplies a reference voltage, which is generated at a power supply (not shown) through the silver dot, to the common electrode 14 through a common pad.

There is a problem in that the common voltage is distorted and a horizontal cross talk is generated because the line resistance of the common line is high. Further, the silver dot is placed between the thin film transistor substrate 70 and the color filter array substrate 80 as a paste, and then the thin film transistor substrate 70 and the color filter array substrate 80 are bonded. Thus, the silver dot spreads out to an adjacent area as a result of a pressure applied to the substrates 1, 11. At this time, a relatively large silver dot area is required on the inside of a scribing line so that as the silver dot expands to the adjacent area it is not damaged by a scribing process. In addition, for small liquid crystal display panels, the silver dot process needs to be performed throughout the whole panel area after a plurality of small panel areas are formed on a mother substrate, thus there is a problem in that the process is more complicated and has a longer process time in comparison with large liquid crystal display panels.

SUMMARY OF THE INVENTION

Accordingly, the present invention is directed to liquid crystal display panel and method of fabricating the same that substantially obviates one or more of the problems due to limitations and disadvantages of the related art.

An advantage of the present invention is to provide a liquid crystal display panel that is adaptive for being miniaturized as well as reducing a process time, and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel, including: a first substrate having a common electrode; a second substrate including a pixel electrode that forms an electric field with the common electrode, a thin film transistor connected to the pixel electrode, a signal line that applies a signal to the thin film transistor, and a contact area in an area outside an area where the signal line is, and the contact area applies a common voltage to the common electrode; and a sealant formed between the first and second substrates with a conductive spacer that connects the contact area with the common electrode.

In another aspect of the present invention, a liquid crystal display panel, including: a first substrate with a first electrode; a second substrate with a contact area to apply an electrical signal to the first electrode and a second electrode; a liquid crystal layer between the first and second substrates; and a sealant that has at least one electric conductor disposed between the contact area and the first electrode, bonds the first and second substrates together, and electrically connects the first electrode with the contact area.

In another aspect of the present invention, a method of fabricating a liquid crystal display panel, including: providing a first substrate having a common electrode; providing a second substrate including a pixel electrode that forms an electric field with the common electrode, a thin film transistor connected to the pixel electrode, a signal line that applies a signal to the thin film transistor, and a contact area in an area outside an area where the signal line is, and the contact area applies a common voltage to the common electrode; and bonding the first substrate and the second substrate using a first sealant having a conductive spacer that connects the contact area with the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A to 3E are plane views and sectional diagrams representing several embodiments of a contact area in detail for supplying a common voltage to a common electrode;

FIG. 6 is a sectional diagram representing a transflective liquid crystal display panel that has a sealant with a conductive pattern; and FIGS. 7A to 7F are sectional diagrams representing a fabricating method of the liquid crystal display panel shown in FIG. 6.

DETAILED DESCRIPTION OF THE PREFERRED EMBODIMENT

Reference will now be made in detail to an embodiment of the present invention, example of which is illustrated in the accompanying drawings.

Hereinafter, the preferred embodiments of the present invention will be described in detail with reference to FIGS. 2 to 7F.

Figure 1:
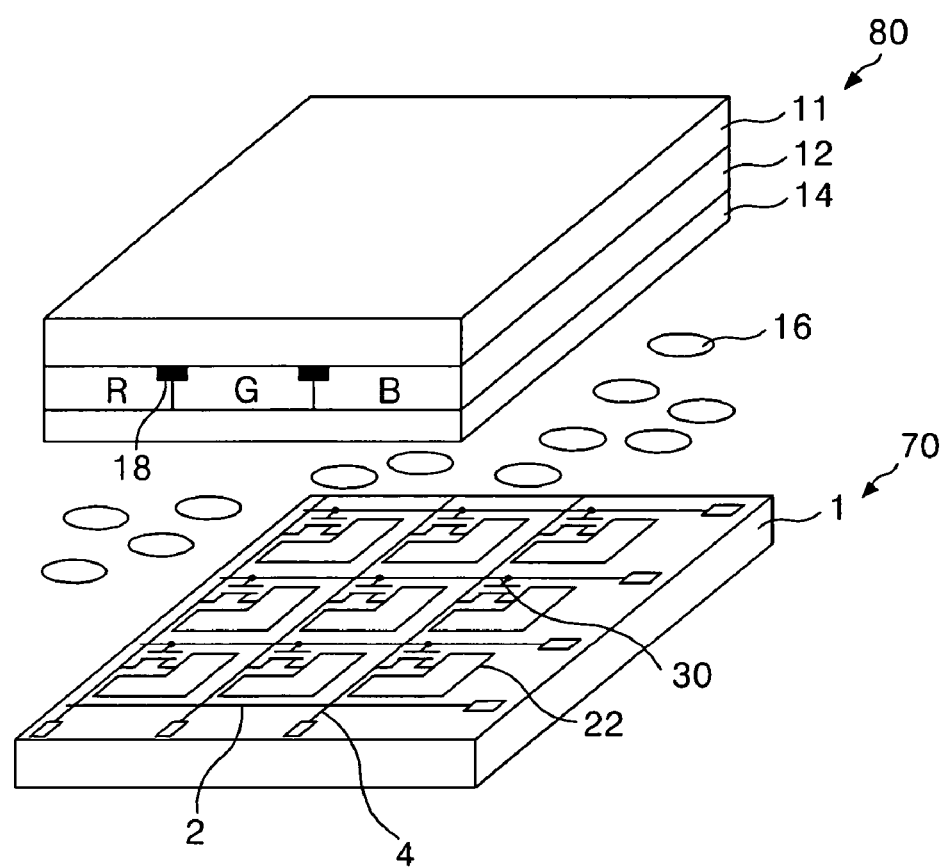
FIG. 1 a perspective view representing a related art liquid crystal display panel.
Figure 2:
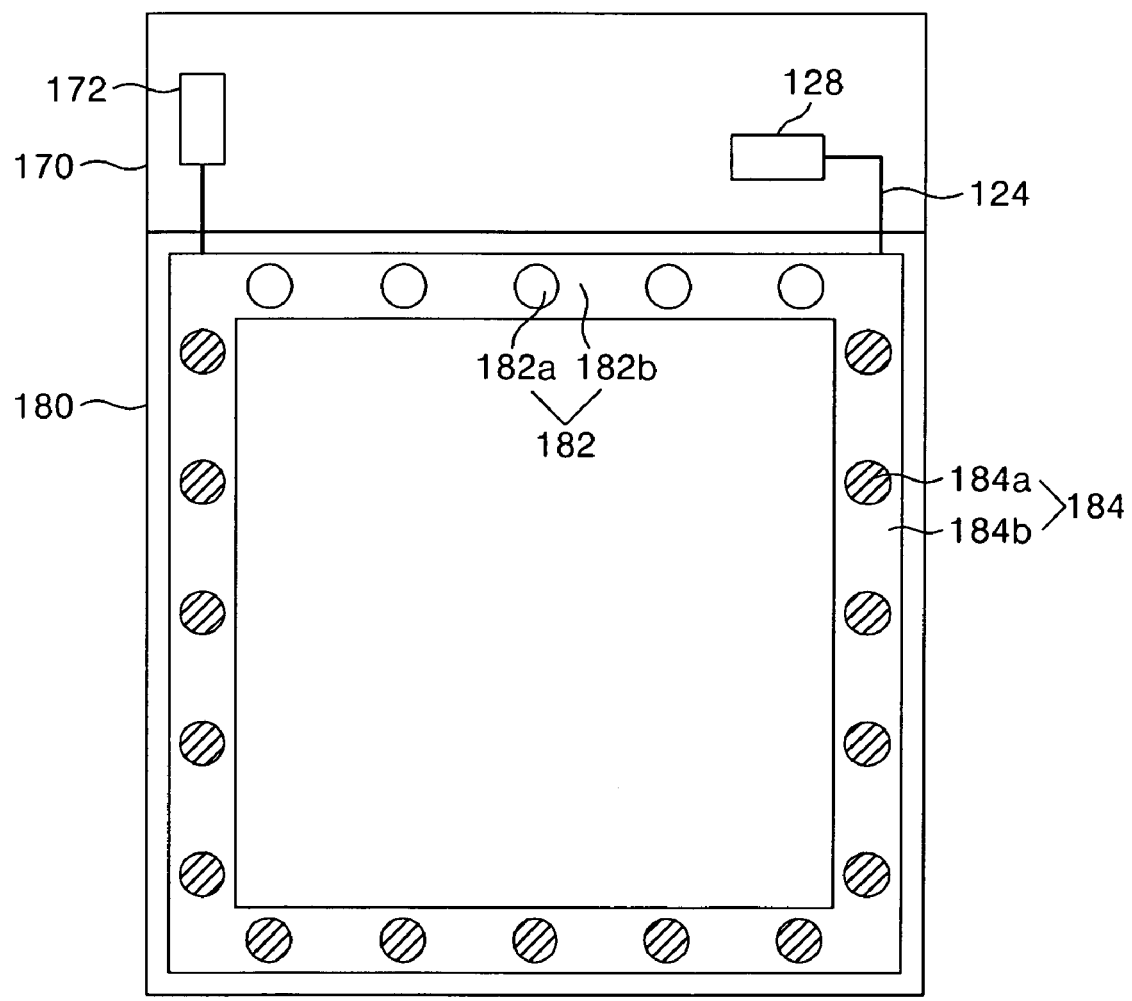
FIG. 2 is a plane view representing a liquid crystal display panel according to the present invention.

FIG. 2 is a plane view representing a liquid crystal display panel according to the first embodiment of the present invention.

Referring to FIG. 2, the liquid crystal display panel includes a thin film transistor array substrate 170 having a thin film transistor array; a color filter array substrate 180 having a color filter array; and first and second sealants 184, 182 to bond the thin film transistor array substrate 170 and the color filter array substrate 180.

The thin film transistor array substrate 170 has a thin film transistor array that includes a gate line and a data line that cross each other, a thin film transistor at the crossing of the gate line and the data line, and a lower alignment film to aligning the liquid 16 crystal thereon.

The color filter array substrate 180 has a color filter array that includes a black matrix for preventing light leakage, a color filter for realizing color, a common electrode that forms an electric field with the pixel electrode, and an upper alignment film to align liquid crystal 16 thereon.

First and second sealants 184, 182 are formed of a material according to the location of the signal line 124.

In the first sealant 184, a conductive spacer 184a is added to the sealant 184b so that it electrically connects the common line 124 with the common electrode. The conductive spacer 184a is a conductive glass fiber or a conductive ball. On the other hand, the glass fiber included in the first sealant 184 has low elasticity, so if a pressure is applied to the sealant 184, a gate insulating film and/or passivation film is pierced by the glass fiber. In order to prevent the conductive spacer 184a and the signal lines DL and GL from being short-circuited through the pierced gate insulating film and/or passivation film, the first sealant 184 is formed at an area which does not overlap the signal lines DL and GL.

In the second sealant 182, a non-conductive spacer 182a is added to the sealant 182b so that the color filter substrate 180 and the thin film transistor substrate 170 are bonded while maintaining a fixed cell gap. The second sealant 182 is formed in an area which overlaps the signal lines DL and GL. The non-conductive spacer 182a is a glass fiber or a ball spacer. The glass fiber included in the second sealant 182 has low elasticity, so if a pressure is applied to the sealant 182 and even if a gate insulating film and/or passivation film is pierced by the glass fiber, the glass fiber is a non-conductive material, thus no short-circuit is created in the signal lines DL and GL and the glass fiber.

On the other hand, the liquid crystal display panel according to the present invention includes a common line 124 connected with the common electrode through the first sealant 184 and extended from a FPC pad 172 and/or a common pad 128 connected with a power supply (not shown) on the lower substrate in order to supply a common voltage to the common electrode.

The common line 124, as shown in FIG. 3A to 3E, includes first and second common lines 120, 122 which are connected through a common contact hole 126.

The first common line 120 shown in FIG. 3A is formed along three sides of the lower substrate 101. The first common line 120 is formed of the same metal as the gate line GL on the lower substrate 101.

The second common line 122 is also formed along at least three sides of the lower substrate 101. The second common line 122 is formed of the same metal as the pixel electrode on the passivation film 118 and is connected to the first common line 120 through a common contract hole 126 that penetrates the gate insulating film 112 and the passivation film 118. The common contact hole 126 is formed on the three sides of the lower substrate 101 along the first and second common lines 120, 122. Further, the second common line 122 is connected to the common electrode 162 formed on the upper substrate 111 through the first sealant 184.

The first common line 120 shown in FIG. 3B is formed along three sides of the lower substrate 101. The first common line 120 is formed of the same metal as the gate line GL on the lower substrate 101.

The second common line 122 is formed to overlap the first common line 120 in parallel to the data line DL, and is connected to the first common line 120 through a common contract hole 126 that penetrates the gate insulating film 112 and the passivation film 118. The second common line 122 is formed of the same metal as the pixel electrode on the passivation film 118.

The common contact hole 126 is formed on the two sides of the lower substrate 101 along the second common lines 122. Further, the second common line 122 is connected to the common electrode 162 formed on the upper substrate 111 through the first sealant 184.

Figure 3C:
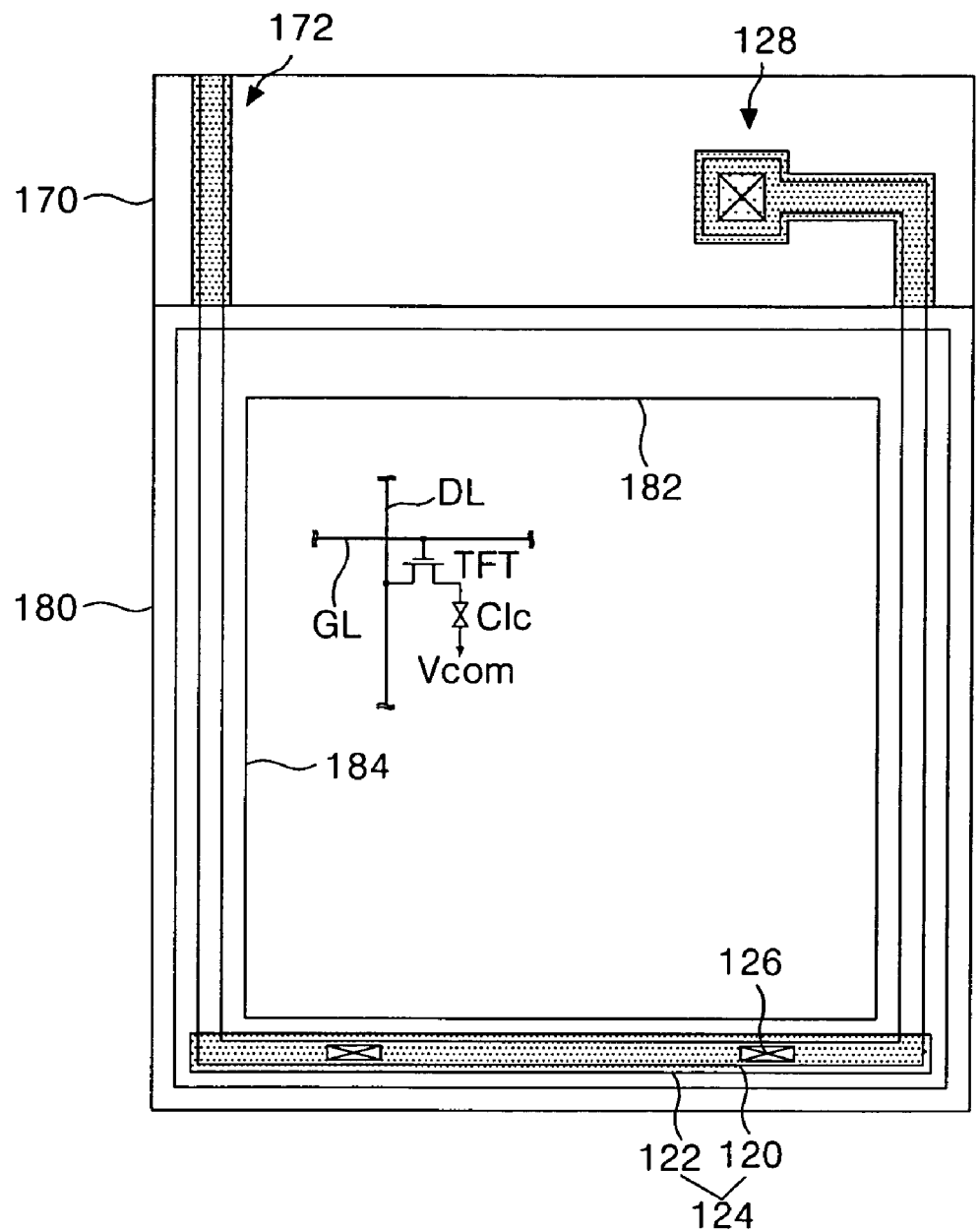

The first common line 120 shown in FIG. 3C is formed along three sides of the lower substrate 101. The first common line 120 is formed of the same metal as the gate line GL on the lower substrate 101.

The second common line 122 is formed to overlap the first common line 120 in parallel to the gate line DL corresponding to a liquid crystal injection hole (not shown). The second common line is formed of the same metal as the pixel electrode on the passivation film 118 and is connected to the first common line 120 through a common contract hole 126 that penetrates the gate insulating film 112 and the passivation film 118. The common contact hole 126 is formed on the one side of the lower substrate 101 along the second common line 122. Further, the second common line 122 is connected to the common electrode 162 formed on the upper substrate 111 through the first sealant 184.

Figure 3D:
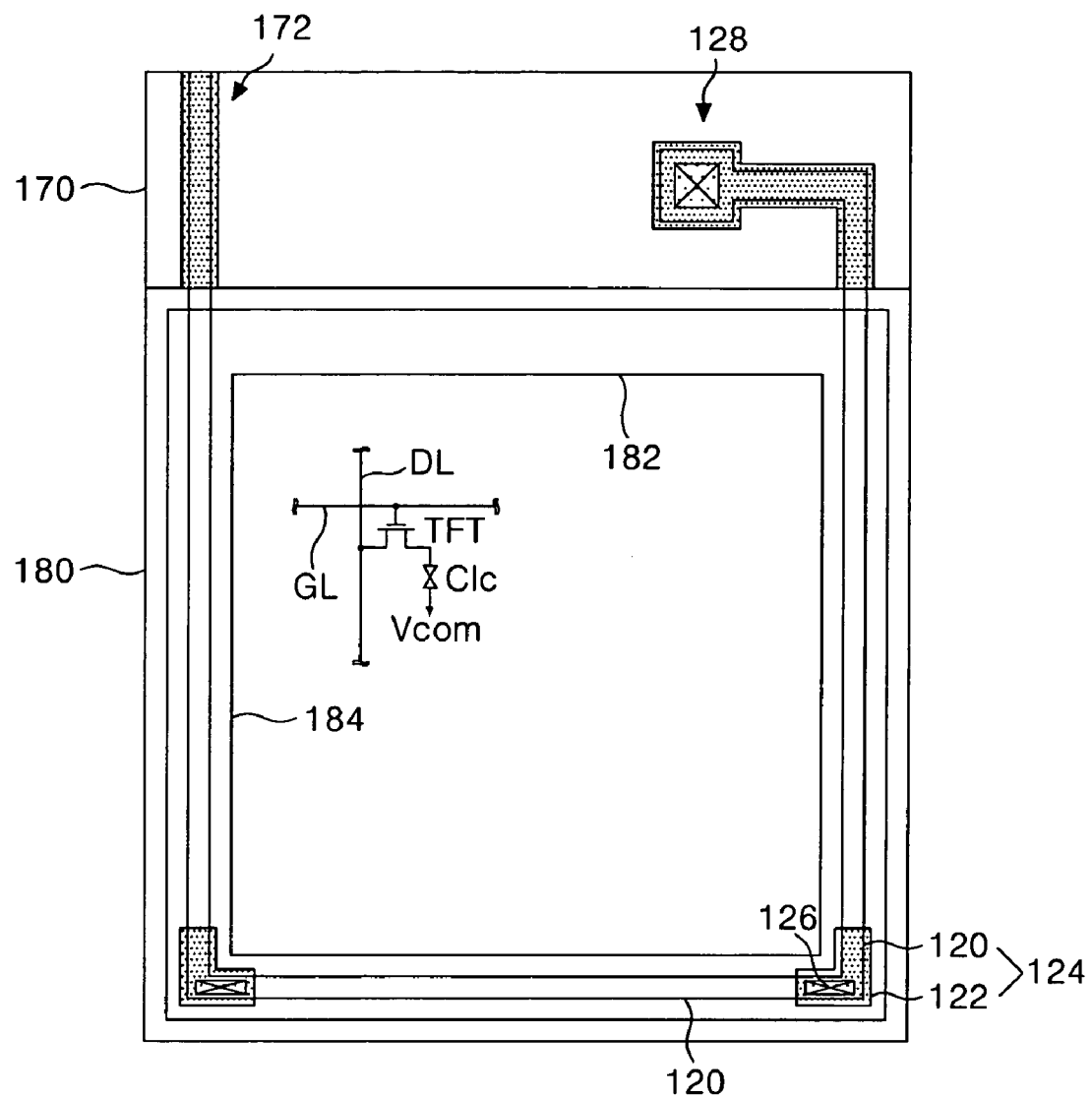

The first common line 120 shown in FIG. 3D is formed along three sides of the lower substrate 101. The first common line 120 is formed of the same metal as the gate line GL on the lower substrate 101.

The second common line 122 is formed to overlap the first common line 120 at a corner area of the lower substrate 101. The second common line 122 is formed of the same metal as the pixel electrode on the passivation film 118, and is connected to the first common line 120 through a common contract hole 126 that penetrates the gate insulating film 112 and the passivation film 118. The common contact hole 126 is formed in the corner of the lower substrate 101 along the second common line 122. Further, the second common line 122 is connected to the common electrode 162 formed on the upper substrate 111 through the first sealant 184. Accordingly, the contact hole 126 shown in FIG. 3D has a smaller contact area than the other contact holes 126 shown in FIGS. 3A, 3B, 3C and 3E.

Figure 3E:
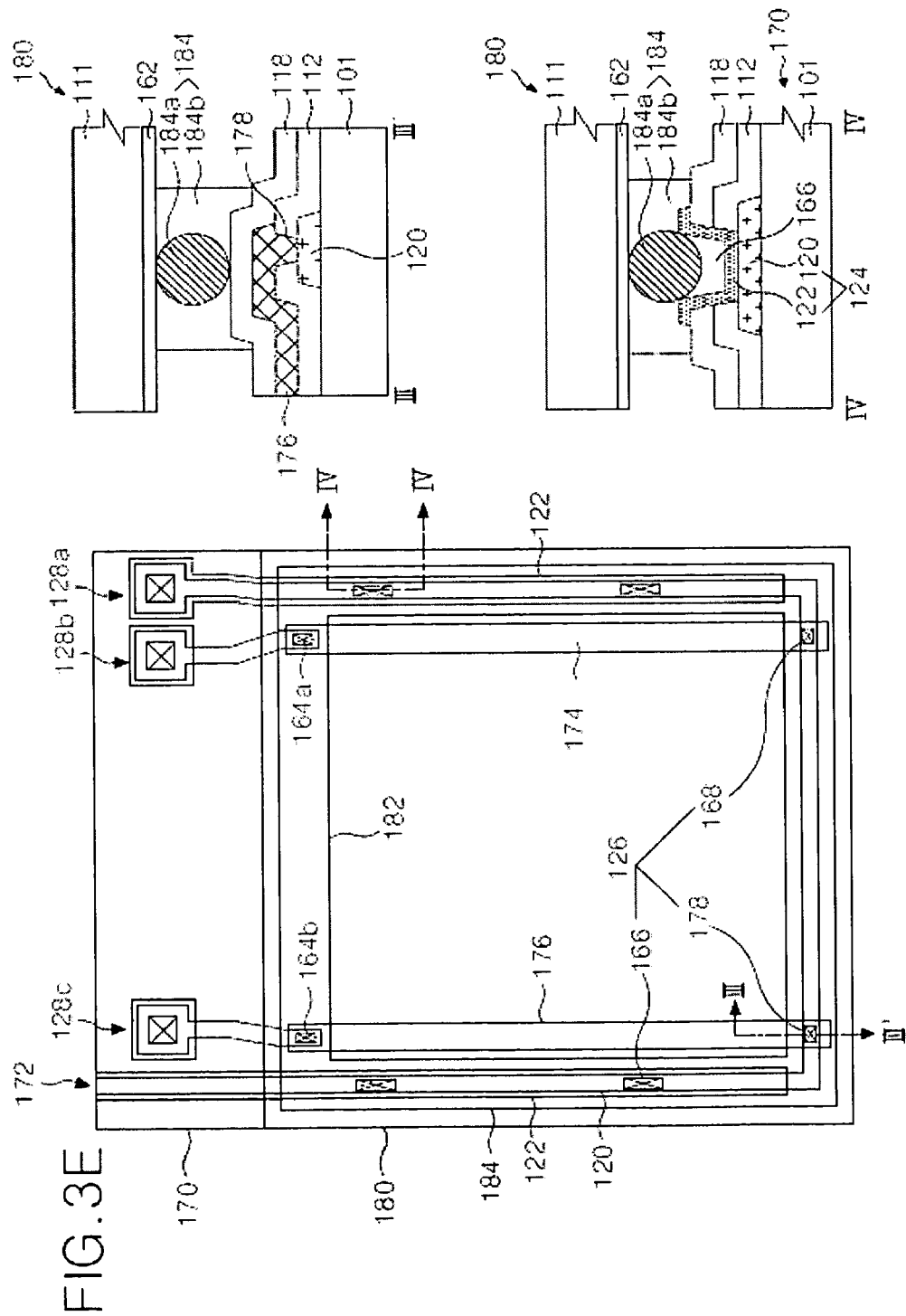

The first common line 120 shown in FIG. 3E is formed along three sides of the lower substrate 101. The first common line 120 is formed of the same metal as the gate line GL on the substrate 101.

The second common line 122 is formed to overlap the first common line 120 in a direction parallel to the data line DL. The second common line 122 is formed of the same metal as the pixel electrode on the passivation film 118 and is connected to the first common line 120 through a first common contract hole 166 that penetrates the gate insulating film 112 and the passivation film 118.

One side of the first and second common lines 120, 122 is connected to a first common pad 128a, and the other side is connected to the FPC pad 172, thereby supplying a common voltage to the liquid crystal display panel.

A third common line 174 is formed of the same metal as the data line DL on the gate insulating film 112. The third common line 174 is formed in a direction parallel to the data line DL and within an area that is sealed by the first and second sealants 184, 182. The third common line 174 is connected to a second common pad 128b through a first link contact hole 164a formed in an area which overlaps the first sealant 184. Further, the third common line 174 is connected to the first common line 120 through the second common contact hole 168 formed in an area which overlaps the first sealant 184.

A fourth common line 176 is formed of the same metal as the data line DL on the gate insulating film 112. The fourth common line 176 is formed in a direction parallel to the data line DL within an area sealed by the first and second sealants 184, 182. The fourth common line 176 is connected to a third common pad 128c through a second link contact hole 164b formed in an area which overlaps the first sealant 184. Further, the fourth common line 176 is connected to the first common line 120 through a third common contact hole 178 formed in an area which overlaps the first sealant 184.

Figure 4A:
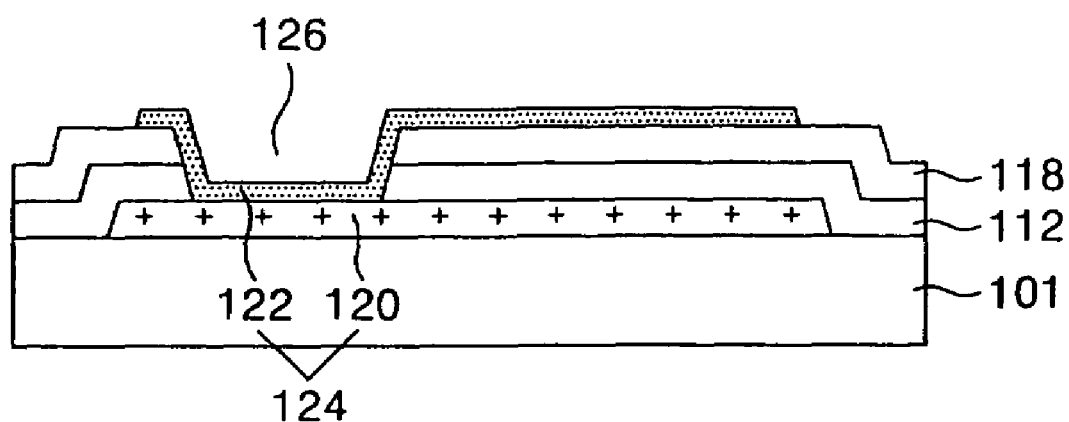
FIGS. 4A to 4E are sectional diagrams representing a contact hole shown in FIGS. 3A to 3E.

The common contact hole 126 shown in FIGS. 3A to 3E has a structure as shown in FIGS. 4A to 4E. The common contact hole 126 shown in FIG. 4A is formed to penetrate the passivation film 118 and the gate insulating film 112 to electrically connect the first common line 120 and the second common line 122.

Figure 4B:
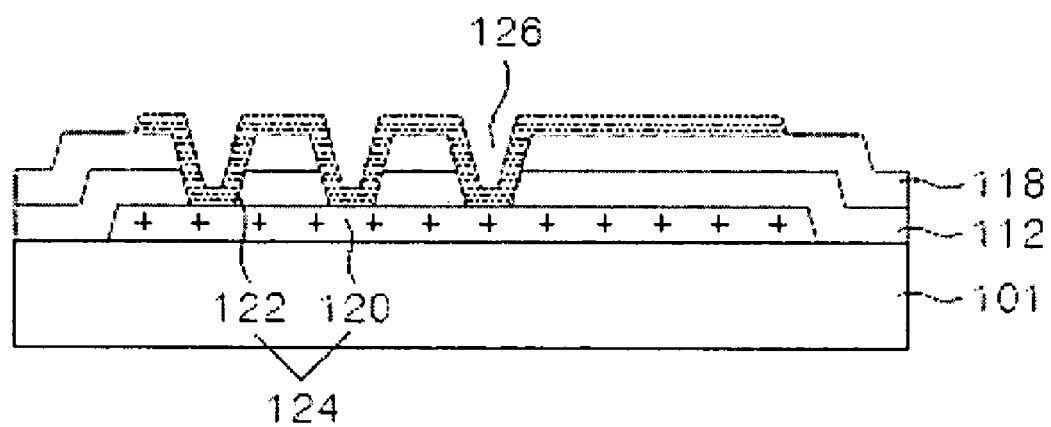

A plurality of common contact holes 126 shown in FIG. 4B are formed to penetrate the passivation film 118 and the gate insulating film 112 to electrically connect the first common line 120 with the second common line 122. In this case, the contact area of the first and second common lines 120, 122 is larger than the first common lines 120, 122 shown in FIG. 4A, thus the contact resistance may be minimized.

Figure 4C:
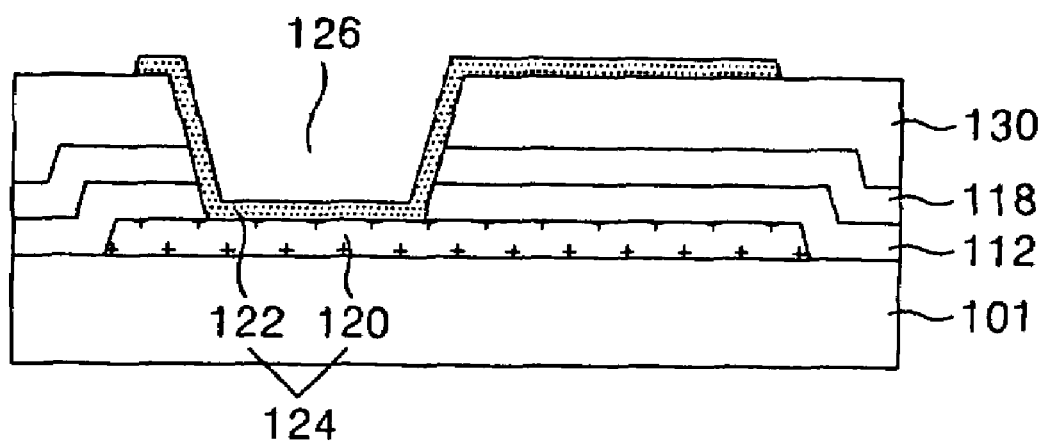

The common contact hole 126 shown in FIG. 4C is formed to penetrate an organic film 130, the passivation film 118, and the gate insulating film 112 to electrically connect the first common line 120 with the second common line 122.

Figure 4D:
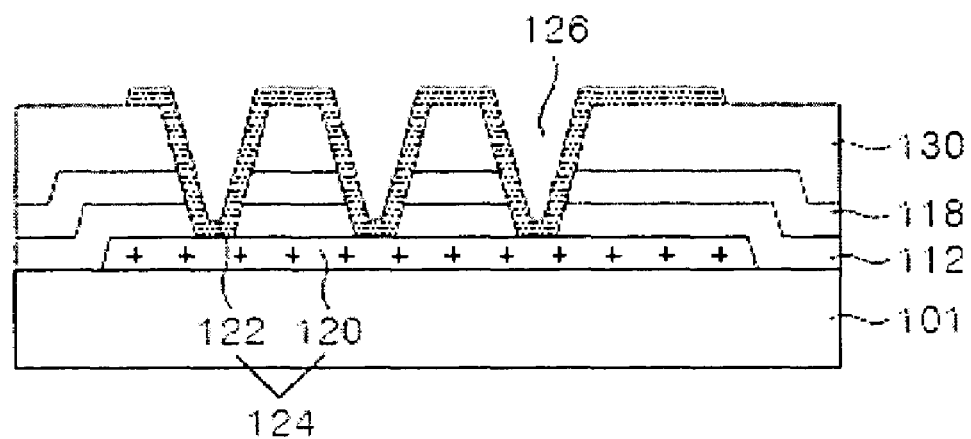

A plurality of common contact holes 126 shown in FIG. 4D are formed to penetrate the organic film 130, the passivation film 118, and the gate insulating film 112 to electrically connect the first common line 120 with the second common line 122. In this case, the contact area of the first and second common lines 120, 122 is larger than the first common lines 120 shown in FIG. 4C, thus the contact resistance may be minimized.

Figure 4E:
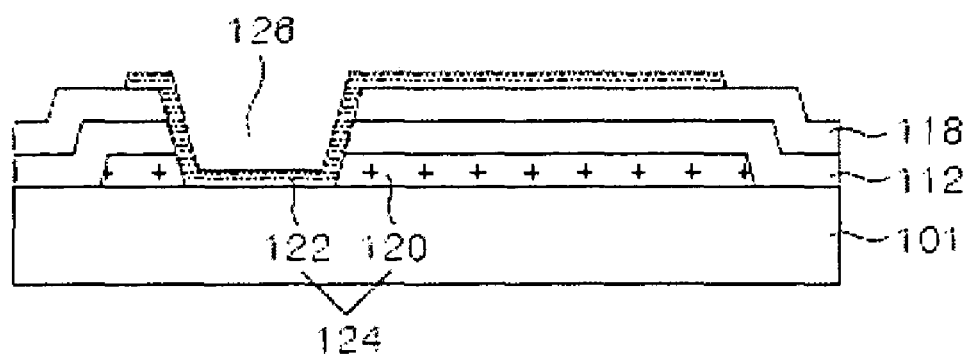

The common contact hole 126 shown in FIG. 4E is formed to penetrate the first common line 120, the gate insulating film 112 and the passivation film 118, so that the first common line 120 laterally contacts the second common line 122. In this case, the first common line is formed of a metal such as molybdenum with high reactivity to the etching gas.

The common contact hole 126 shown in FIGS. 4A to 4E is formed to have a greater width than the conductive spacer 184A that is included in the sealant 184. For example, the common contact hole 126 is formed to have a minimum width of 50 μm.

Figure 5A:
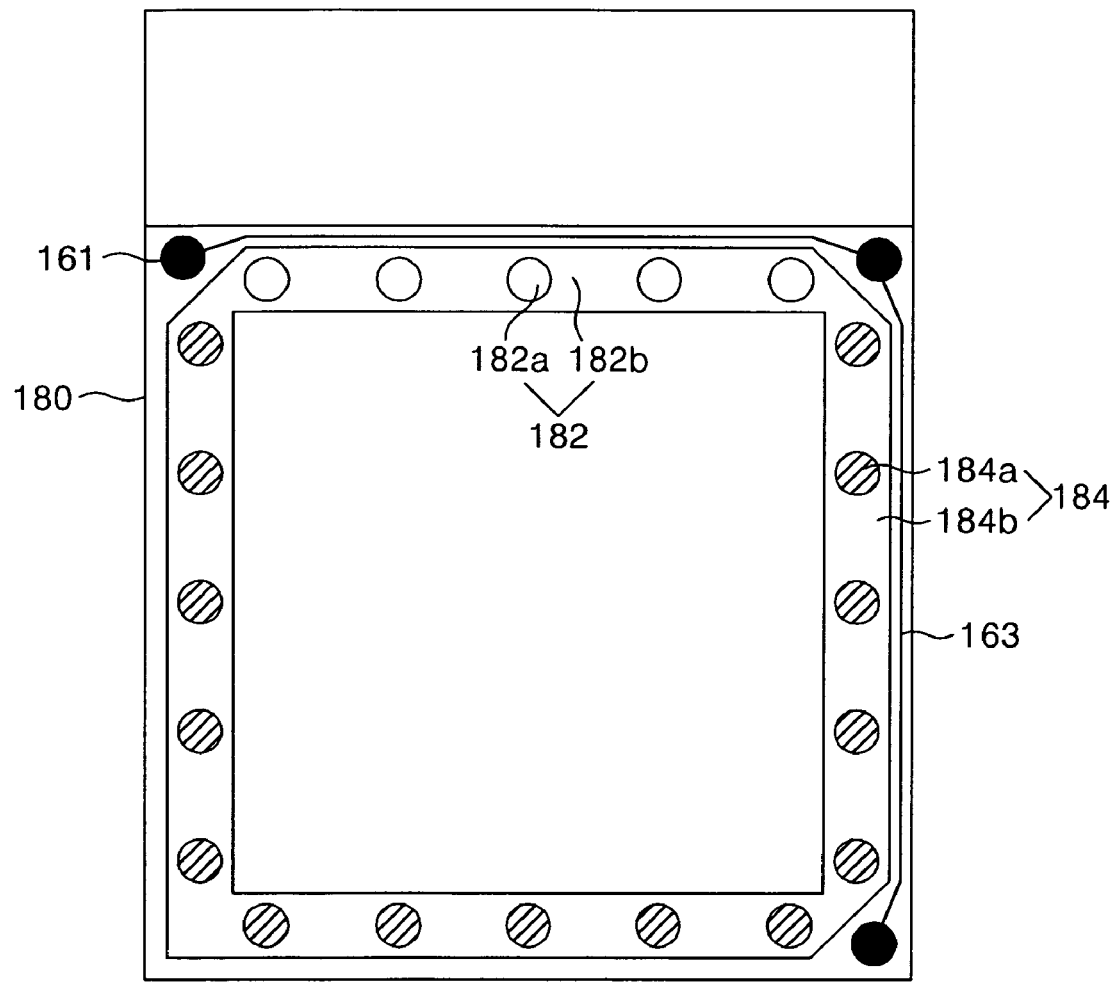
FIGS. 5A to 5C are plane views and sectional diagrams representing a substrate where a silver dot and a sealant having a conductive pattern are formed.
Figure 5B:
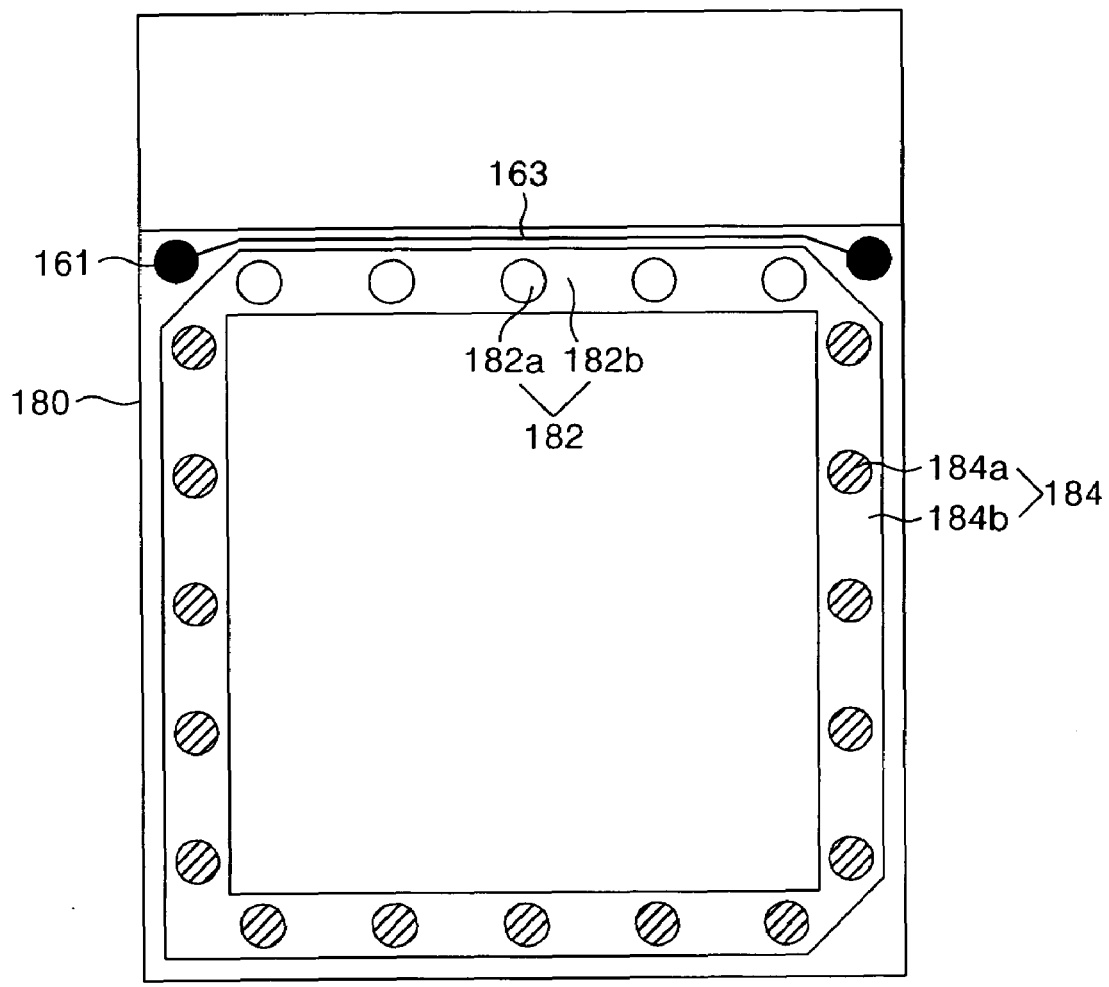

On the other hand, the common voltage may be supplied to the common electrode using the silver dot 161 formed at the outer portion of the lower substrate as shown in FIGS. 5A and 5B except that the common electrode is connected to the common line using the conductive spacer which is included in the sealant. The silver dot 161 is electrically connected to a separate conductive line 163.

Figure 5C:
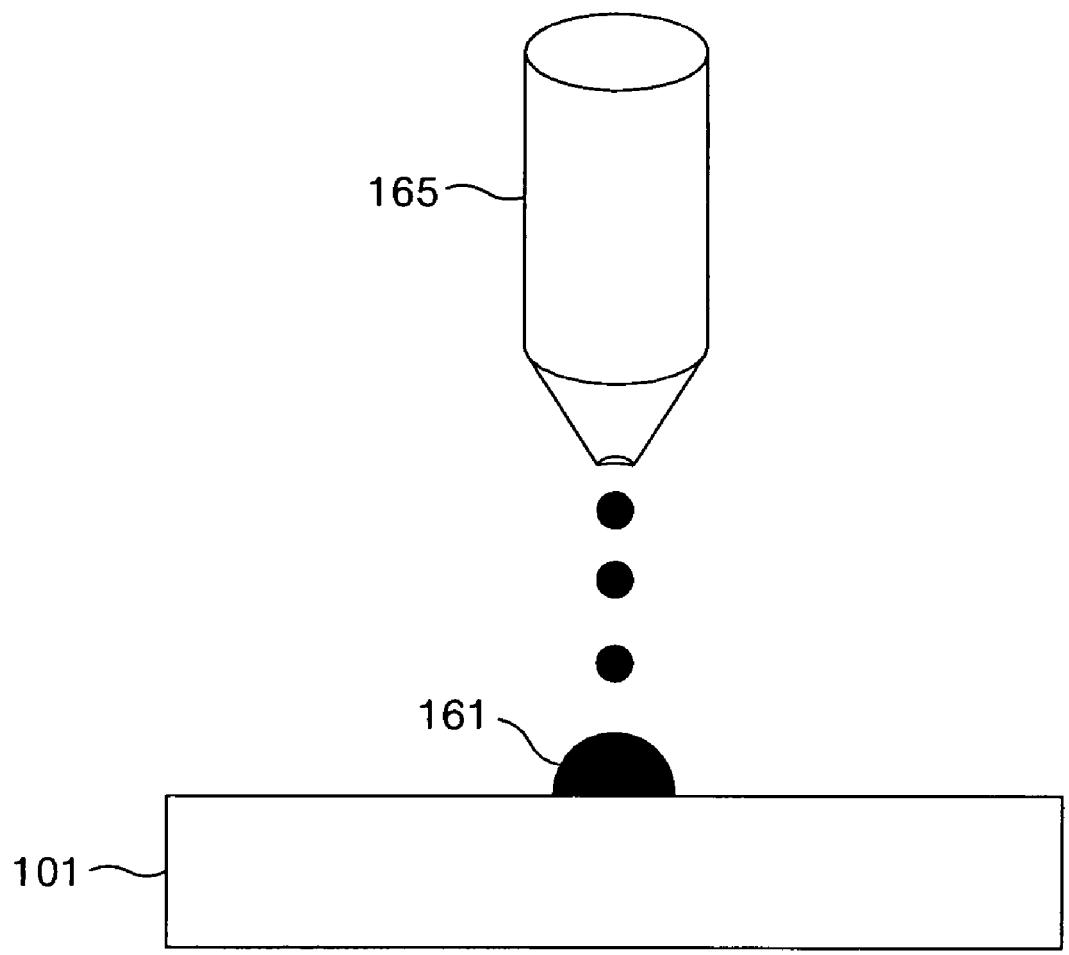

The silver dot 161, as shown in FIG. 5C, is printed on the lower substrate 101 using an inkjet device 165. Silver Ag or gold Au is printed in a powder of nanometer size through the inkjet device 165 or a conductive ball plated with silver or gold is printed on the substrate. The silver dot 161 printed through the inkjet device 165 is formed with a width of tens or hundreds of microns, thus it is easily applied to a small size liquid crystal display panel.

FIG. 6 is a sectional diagram representing a thin film transistor substrate of a transflective liquid crystal display panel having first and second common lines shown in FIG. 4.

The thin film transistor substrate shown in FIG. 6 includes a gate line and a data line that define a pixel area, a thin film transistor connected to the gate line and the data line, a pixel electrode 142 formed in the pixel area and connected to the thin film transistor, and a reflective electrode 156 formed at a reflective area of the pixel area.

The thin film transistor selectively supplies a data signal from the data line to the pixel electrode 142 in response to a gate signal from the gate line. The thin film transistor includes a gate electrode 106 connected to the gate line, a source electrode 108 connected to the data line, a drain electrode 110 connected to the pixel electrode 142, an active layer 114 which overlaps the gate electrode 106 with a gate insulating film 112 therebetween to form a channel between the source electrode 108 and the drain electrode 110, and an ohmic contact layer 116 for an ohmic contact of the active layer 114, the source electrode 108 and the drain electrode 110.

The pixel electrode 142 is formed in the pixel area that is defined by the crossing of the data lines and the gate lines, and is connected to the drain electrode 110. The pixel electrode 142 with the common electrode (not shown) generates a potential difference according to the data signal supplied through the thin film transistor. A liquid crystal rotates according to the potential difference, and the light transmissivity is determined by the extent of rotation of the liquid crystal in each of the reflective area and the transmission area.

The reflection electrode 156 reflects external light, that is incident through a color filter substrate (not shown) back towards the color filter substrate. The reflection electrode 156 has an embossed shape because of an organic film 130 which is formed to have an embossed surface, thereby increasing reflective efficiency by a dispersion effect. The area where the reflective electrode 156 is formed becomes a reflective area in each pixel area, and the area where the reflective electrode 156 is not formed becomes a transmission area in each pixel area.

A transmission hole 132 is formed that penetrates the organic film 130 in the transmission area so that the path length of the light passing through the liquid crystal layer in the reflective area and the transmission area becomes substantially equal. As a result, the reflected light that is incident in the reflection area is reflected from the reflective electrode 156 through the liquid crystal layer to be emitted from the liquid crystal display panel. The light emitted by the backlight unit (not shown) that is incident upon the transmission area passes through the liquid crystal layer out of the liquid crystal display panel. Accordingly, the length of the light path in the reflective area and the transmission area is substantially same, thus the transmission efficiency of the reflective mode and the transmission mode of the liquid crystal display device becomes the same.

FIGS. 7A to 7F are sectional diagrams representing a fabricating method of the transflective thin film transistor array substrate shown in FIG. 6.

Referring to FIG. 7A, a first conductive pattern group is formed including the gate electrode 106 and the first common line 120 on the lower substrate 101.

A gate metal is formed on the lower substrate 101 by a deposition method such as sputtering. The gate metal is patterned by a photolithography process and an etching process, thereby forming the first conductive pattern group including the gate electrode 106 and the first common line 120. The gate metal layer has a single layer or multi layer structure of, for example, Al, Mo, Cr, Cu, Al alloy, Mo alloy, Cu alloy.

Figure 7B:
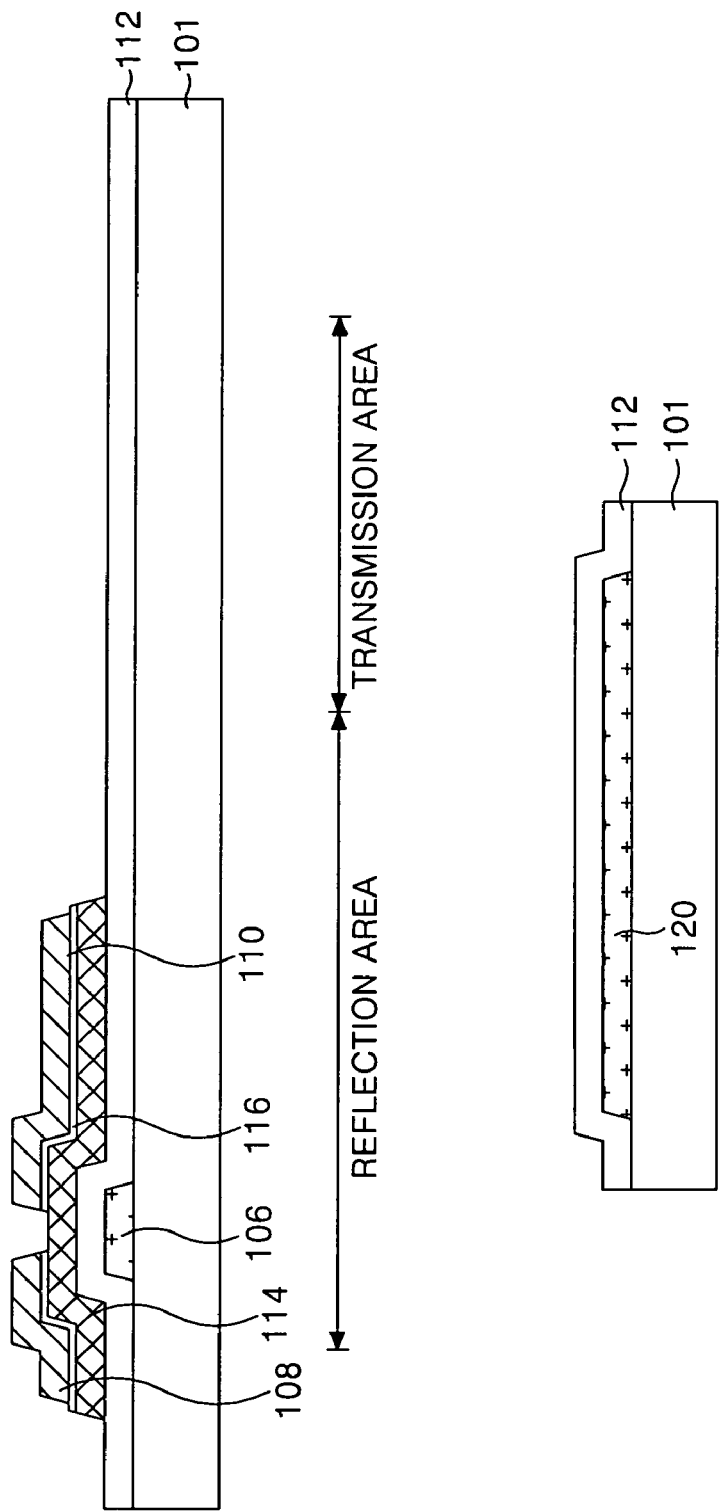

Referring to FIG. 7B, a gate insulating film 112 is formed on the lower substrate 101 where the first conductive pattern group is formed. A semiconductor pattern is formed including an active layer 114 an ohmic contact layer 116, and a second conductive pattern group is formed on the semiconductor pattern including data line, a source electrode 108 and a drain electrode 110.

A gate insulating film 112, an amorphous silicon layer, an amorphous silicon layer doped with impurities and a source/drain metal layer are sequentially formed on the lower substrate 101 where the first conductive pattern group is formed, by a deposition method such as PECVD or sputtering. The gate insulating film 112 may be an inorganic insulating material such as silicon oxide SiOx or silicon nitride SiNx, and the source/drain metal layer is the single or double layer structure of Al, Mo, Cr, Cu, Al alloy, Mo alloy, Cu alloy, etc.

A photo resist pattern is formed where a channel portion on the source/drain metal layer has a lower height than the other source/drain pattern portion. The source/drain metal layer is patterned by a wet etching process using the photo resist pattern, thereby forming the second conductive pattern group including the data line, the source electrode 108, and the drain electrode 110 integrated with the source electrode 108.

Then, the amorphous silicon layer and the amorphous silicon layer doped with impurities are simultaneously patterned by the wet etching process using the same photo resist pattern, thereby forming the ohmic contact layer 116 and the active layer 114.

The source/drain pattern and ohmic contact layer 116 of the channel portion are etched by a dry etching process after removing the photo resist pattern having a relatively lower height at the channel portion by an ashing process. Accordingly, the active layer 114 of the channel portion is exposed to separate the source electrode 108 from the drain electrode 110.

Subsequently, the photo resist pattern remaining on the second conductive pattern group is removed by a stripping process.

Referring to FIG. 7C, a first passivation film 118 is formed on the substrate 101 where the second conductive pattern group is formed, and an organic film 130 is formed thereon, wherein the organic film 130 has an open hole 152, a transmission hole 132, and a common contact hole 126, and the organic film 130 has an embossed surface.

The first passivation film 118 and the organic film 130 are sequentially formed on the gate insulating film 112 where the second conductive pattern group is formed. The first passivation film 118 may be formed of the same inorganic insulating material as the gate insulating film 112, and the organic film 130 may be formed of an organic insulating material such as acrylic.

Next, the organic film 130 is patterned by a photolithography process, thereby forming the open hole 152, the transmission hole 132, and the common contact hole 126. At this moment, the mask used to form the organic film 130 has a structure including a shielding part and a diffractive exposure part that repeat on the mask except where the transmission part is located corresponding to the transmission hole. Accordingly, the organic film 130 is patterned in a structure according to the repeated diffractive exposure area (a groove area) and the shielding area (a projecting area). Subsequently, the organic film 130 with the repeated projecting area and groove area are heated, thus the surface of the organic film 130 has an embossed shape. Particularly, the area where the pixel area contacts the sealant is formed to have the embossed shape in the organic film 130.

Referring to FIG. 7D, a third conductive pattern group is formed including the reflection electrode 156 on the organic film 130 that has the embossing shape.

A reflective metal layer is deposited on the organic film 130 while maintaining the embossing shape. The reflective metal layer is formed of a metal that is highly reflective characteristic such as Al, AiNd, and so on. Subsequently, the reflective metal layer is patterned by the photolithography process and the etching process, thereby forming the third conductive pattern group including the reflective electrode 156.

Referring to FIG. 7E, a second passivation film 136 is formed on the organic film 130 where the third conductive pattern group is formed.

The second passivation film 136 may be formed of the same inorganic insulating material as the first passivation film 118. Then, the second passivation film 136 and the first passivation film 118 are patterned by a photolithography process and the etching process, thereby forming the drain contact hole 154 and the common contact hole 126. The drain contact hole 154 exposes the drain electrode 110 of the thin film transistor. The common contact hole 126 exposes the first common line 120. In another embodiment, the second passivation film 136 might not be formed.

Referring to FIG. 7F, a fourth conductive pattern group is formed including a pixel electrode 142 and a second common line 122 on the second passivation film 136.

A transparent conductive layer is formed on the entire surface of the second passivation film 136. The transparent conductive layer may be indium tin oxide ITO, tin oxide TO, indium tin zinc oxide ITZO, indium zinc oxide IZO and so on. The transparent conductive layer is patterned by a photolithography process and an etching process, thereby forming the fourth conductive pattern group including the pixel electrode 142 and the second common line 122.

In describing the first and second common line and the common contact hole that supplies a common voltage to the common electrode, the example of a transflective liquid crystal display panel is used, but this description may be applied to various liquid crystal display panels such as a transmissive liquid crystal display panel.

As described above, the liquid crystal display panel and the fabricating method thereof according to the present invention connects the common electrode of the upper substrate with the common pattern of the lower substrate by use of a conductive spacer which is included in the sealant. Accordingly, no separate silver dot process is required, thus the fabrication process may be simplified and the cost resulting from the silver dot process may be reduced.

Further, in the liquid crystal display panel and the fabricating method thereof according to the present invention, the contact area is formed in a "U" shape along the three sides of the lower substrate, thereby increasing the contact area with the common electrode. Accordingly, the line resistance caused by the common pattern is reduced, thus the common voltage is stabilized and a high contrast ratio can be obtained.

Besides, the liquid crystal display panel and the fabricating method thereof according to the present invention does not require a separate silver dot area, thus the size of the substrate may be reduced, thereby further, reducing the size of a small liquid crystal display panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a first substrate having a common electrode;
   a second substrate including a pixel electrode that forms an electric field with the common electrode, a thin film transistor connected to the pixel electrode, a signal line that applies a signal to the thin film transistor, and a contact area in an area outside an area where the signal line is, and the contact area applies a common voltage to the common electrode; and
   a first sealant formed between the first and second substrates and along three edges of thereof, wherein the sealant includes a conductive spacer that connects the contact area with the common electrode; and
   a second sealant formed between the first and second substrates and along one edge of thereof in an area where the signal line is, wherein the second sealant exclusively includes a non-conductive spacer without conductive spacers.

2. The liquid crystal display panel according to claim 1, wherein the conductive spacer is formed of one of a conductive glass fiber and a conductive ball.

3. The liquid crystal display panel according to claim 1, wherein the non-conductive spacer is formed of one of a glass fiber and a ball spacer.

4. The liquid crystal display panel according to claim 1, wherein the contact area includes:
   a first common pattern along at least three sides of the substrate;
   an insulating film having at least one common contact hole that exposes the first common pattern; and
   a second common pattern connected to the first common pattern through the common contact hole and connected to the conductive spacer.

5. The liquid crystal display panel according to claim 4, wherein the second common pattern is along at least three sides of the substrate and along the first common pattern.

6. The liquid crystal display panel according to claim 4, wherein the signal line includes:
   a gate line to apply a gate signal to the thin film transistor; and
   a data line to apply a data signal to the thin film transistor.

7. The liquid crystal display panel according to claim 6, wherein the second common pattern is in parallel to one of the data line and the gate line.

8. The liquid crystal display panel according to claim 4, wherein the second common pattern is in an area corresponding to a liquid crystal injection hole.

9. The liquid crystal display panel according to claim 4, wherein the second common pattern is in a corner area of the second substrate.

10. The liquid crystal display panel according to claim 4, further comprising a common pad formed at both sides of the second substrate to be connected to both sides of the first and second common pattern.

11. The liquid crystal display panel according to claim 4, wherein the first common pattern is formed of the same metal as a gate electrode of the thin film transistor, and the second common pattern is formed of the same material as the pixel electrode.

12. The liquid crystal display panel according to claim 4, wherein the contact part further includes third and fourth common patterns that are close to the second common pattern in an area sealed by the first and second sealants.

13. The liquid crystal display panel according to claim 12, wherein at least one of the third and fourth common pattern is formed of the same metal as a source electrode of the thin film transistor to be connected with the first common pattern through a second common contact hole that penetrates an insulating film.

14. The liquid crystal display panel according to claim 13, wherein the second common contact hole is formed in an area that overlaps the first and second sealants.

15. The liquid crystal display panel according to claim 5, further comprising a reflective electrode which is formed in a reflective area of a pixel area defined by a gate line and a data line.

16. A method of fabricating a liquid crystal display panel, comprising:
   providing a first substrate having a common electrode;
   providing a second substrate including a pixel electrode that forms an electric field with the common electrode, a thin film transistor connected to the pixel electrode, a signal line that applies a signal to the thin film transistor, and a contact area in an area outside an area where the signal line is, and the contact area applies a common voltage to the common electrode; and
   bonding the first substrate and the second substrate using a first sealant and a second sealant,
   wherein the first sealant has a conductive spacer that connects the contact area with the common electrode, and formed between the first and second substrates and along three edges of thereof,
   wherein the second sealant exclusively has a non-conductive spacer without the conductive spacer in an area overlapping the signal line and the first sealant and is formed between the first and second substrates and along one edge of thereof.

17. The method according to claim 16, wherein the conductive spacer is formed of one of a conductive glass fiber and a conductive ball.

18. The method according to claim 16, wherein the non-conductive spacer is one of a glass fiber and a ball spacer.

19. The method according to claim 16, wherein providing the second substrate includes:
   forming a first common pattern on the second substrate;
   forming at least one insulating film on the first common pattern;

forming at least one common contact hole that penetrates the insulating film to expose the first common pattern; and forming a second common pattern that connects to the first common pattern through the common contact hole and connected to the conductive spacer.

20. The method according to claim 16, further comprising forming a liquid crystal layer between the first and second substrates.

* * * * *